United States Patent
Fjeldheim et al.

(10) Patent No.: US 12,553,625 B2
(45) Date of Patent: Feb. 17, 2026

(54) SYSTEM AND METHOD OF CIRCULATING A GAS IN AN AUTOMATED GRID BASED STORAGE AND RETRIEVAL SYSTEM

(71) Applicant: Autostore Technology AS, Nedre Vats (NO)

(72) Inventors: Ivar Fjeldheim, Haugesund (NO); Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 482 days.

(21) Appl. No.: 18/042,325

(22) PCT Filed: Sep. 1, 2021

(86) PCT No.: PCT/EP2021/074158
§ 371 (c)(1),
(2) Date: Feb. 21, 2023

(87) PCT Pub. No.: WO2022/053372
PCT Pub. Date: Mar. 17, 2022

(65) Prior Publication Data
US 2023/0324056 A1    Oct. 12, 2023

(30) Foreign Application Priority Data
Sep. 11, 2020   (NO) .................................. 20200997

(51) Int. Cl.
*B65G 7/00*      (2006.01)
*B65G 1/137*     (2006.01)
*F24F 7/007*     (2006.01)

(52) U.S. Cl.
CPC ............ *F24F 7/007* (2013.01); *B65G 1/1373* (2013.01)

(58) Field of Classification Search
CPC .... F24F 7/007; F24F 13/02; F24F 7/00; F24F 2007/001; F24F 2007/0025;
(Continued)

(56) References Cited

U.S. PATENT DOCUMENTS

| | | |
|---|---|---|
| 5,706,662 A | 1/1998 | Van |
| 6,478,669 B1 | 11/2002 | Van |

(Continued)

FOREIGN PATENT DOCUMENTS

| | | |
|---|---|---|
| CN | 201212017 Y | 3/2009 |
| CN | 104602767 A | 5/2015 |

(Continued)

OTHER PUBLICATIONS

Hoffert, Rudi, Office Action for European Patent Application No. EP21773031.6, dated Sep. 5, 2024, 4 pages, pub. by the EPO, Rijswijk Netherlands.

(Continued)

*Primary Examiner* — Yolanda R Cumbess
(74) *Attorney, Agent, or Firm* — Baker Botts L.L.P.

(57) ABSTRACT

An automated grid based storage and retrieval system includes a framework structure and a plurality of storage containers. The framework structure includes upright members and a grid of horizontal rails provided at upper ends of the upright members. The framework structure defines a storage volume including a plurality of columns arranged in a grid pattern below the horizontal rails between the upright members. The plurality of storage containers are stacked vertically in stacks in the columns to provide a plurality of storage columns. An under-stack void extends beneath the stacks of storage containers. A plurality of inlets lead to the under-stack void between the stacks of storage containers. At least one column, which is empty of storage containers and arranged amongst the storage columns, provides a (Continued)

ventilation column. The ventilation column includes a fan. A plurality of duct walls surrounding the ventilation column define a duct having a first end adjacent the horizontal rails and a second end adjacent the under-stack void. The fan is arranged to circulate gas along sides of the stacks, via the plurality of inlets and the under-stack void, and through the duct.

20 Claims, 9 Drawing Sheets

(58) Field of Classification Search
CPC ... F24F 2007/005; F24F 2007/007–013; F24F 2007/04–065; F24F 2007/08; F24F 2007/10; F24F 11/00; F24F 13/00; F24F 13/0227; F24F 13/0236; B65G 1/1373; B65G 1/1378; B65G 1/0464; B65G 1/0478; B65G 2201/0235; B65G 2207/22; B65G 61/00; B65G 1/00; B65G 1/02; B65G 1/026; B65G 1/04; B65G 1/0471; B65G 1/0485; B65G 1/0492; B65G 1/06–065; B65G 1/07; B65G 1/10; B65G 1/12; B65G 1/127; B65G 1/133; B65G 1/137; B65G 2201/00; B65G 2201/02; B65G 2201/0211; B65G 2201/0258; B65G 1/0457; B65G 65/00; F25D 17/06; F25D 25/04; F25D 13/00; G06Q 10/08
USPC .......................................... 700/213–214, 218
See application file for complete search history.

(56) References Cited

U.S. PATENT DOCUMENTS

| | | | |
|---|---|---|---|
| 9,873,547 B2 * | 1/2018 | Tippmann | B65D 81/263 |
| 2006/0254434 A1 | 11/2006 | Perryman | |
| 2011/0107784 A1 | 5/2011 | Tippmann et al. | |
| 2014/0273793 A1 | 9/2014 | Tippmann | |
| 2014/0273801 A1 | 9/2014 | Tippmann | |
| 2018/0086559 A1 | 3/2018 | Lindbo et al. | |
| 2021/0032031 A1 * | 2/2021 | Kalouche | B25J 9/162 |

FOREIGN PATENT DOCUMENTS

| | | | | |
|---|---|---|---|---|
| JP | H0812010 A | 1/1996 | | |
| JP | H107208 A | 1/1998 | | |
| JP | H10216257 A | 8/1998 | | |
| JP | 2004269214 A | 9/2004 | | |
| JP | 2012-153483 A | 8/2012 | | |
| JP | 2018514667 A | 6/2018 | | |
| NO | 317366 B1 | 10/2004 | | |
| WO | 00/75041 A1 | 12/2000 | | |
| WO | 2011/047710 A1 | 4/2011 | | |
| WO | WO-2014025043 A1 * | 2/2014 | .......... | F24F 13/1406 |
| WO | 2014/075937 A1 | 5/2014 | | |
| WO | 2014/090684 A1 | 6/2014 | | |
| WO | 2015/124610 A1 | 8/2015 | | |
| WO | 2015/193278 A1 | 12/2015 | | |
| WO | 2016/172793 A1 | 11/2016 | | |
| WO | 2016/193418 A1 | 12/2016 | | |
| WO | WO-2016193419 A1 * | 12/2016 | ........... | B65D 81/263 |
| WO | 2018/146304 A1 | 8/2018 | | |

OTHER PUBLICATIONS

Hoffert, Rudi, Extended European Search Report in EP24219682.2, mailed May 30, 2025, 9 pages, European Patent Office, Munich, Germany.
Hoffert, Rudi, Office Action in EP21773031.6, mailed Apr. 4, 2025, 4 pages, European Patent Office, Rijswijk, Netherlands.
International Search Report issued in PCT/EP2021/074158 on Dec. 21, 2021 (5 pages).
Written Opinion of the International Searching Authority issued in PCT/EP2021/074158 on Dec. 21, 2021 (7 pages).
Norwegian Search Report issued in NO 20200997 mailed on Apr. 9, 2021 (2 pages).
Pan, Yu, Office Action in CN202180062036.0, mailed May 29, 2025, 21 pages, The State Intellectual Property Office of the People's Republic of China, Beijing, China.
Fukushima, Kazuyuki, Office Action in JP2023515754, mailed Sep. 5, 2025, 4 pages, Japan Patent Office, Tokyo, Japan.
Pan, Yu, Office Action in CN202180062036.0, mailed Dec. 2, 2025, 7 pages, The State Intellectual Property Office of the People's Republic of China, Beijing, China.

* cited by examiner

SYSTEM AND METHOD OF CIRCULATING A GAS IN AN AUTOMATED GRID BASED STORAGE AND RETRIEVAL SYSTEM

The present invention relates to an automated storage and retrieval system for storage and retrieval of containers, in particular to a system and method of ventilating the automated storage and retrieval system.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, $Z=1$ identifies the uppermost layer of storage containers, i.e. the layer immediately below the rail system 108, $Z=2$ the second layer below the rail system 108, $Z=3$ the third layer etc. In the exemplary prior art disclosed in FIG. 1, $Z=8$ identifies the lowermost, bottom layer of storage containers. Similarly, $X=1 \ldots n$ and $Y=1 \ldots n$ identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position $X=10$, $Y=2$, $Z=3$. The container handling vehicles 201,301 can be said to travel in layer $Z=0$, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018/146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles.

Alternatively, or in addition, the automated storage and retrieval system 1 may have container handling vehicles 201,301 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

Some of the above systems 1 may be used to store product items which require a certain environment. For example, some types of food require a cool temperature environment (typically temperatures between 1° C.-6° C.), some types of food require an even colder temperature environment (typically temperatures lower than −15° C.). If living plants are stored in the system, then a desired gas mixture may be required (a certain mixture of oxygen, nitrogen and carbon dioxide). Such plants, and other product items, may also require a certain air humidity (moist air or dry air). Fire hazardous product items such as oil/gas containing products, fireworks etc. may advantageously be stored in an oxygen-free environment. Here, it may be desired to distribute a gas such as nitrogen into containers within the storage system. Distribution of fire suppression gas into such a storage and retrieval system may also be relevant for extinguishing fires.

In buildings in which such storage systems are located, ventilation systems are typically used to provide the desired environment. However, as the purpose of such storage systems is to store the containers in stacks adjacent to each other, it is a challenge to provide the same environment for all product items stored in the storage system. In particular when the system is filled up with storage containers, airflow through the system is a challenge. If there is no movement of gas along the sides of the storage containers, the storage container will be isolated. This may for example lead to a slow cooling process.

In WO2016/193419, it is disclosed a storage system where the containers are cooled during storage in a grid. The cooling system has a chiller above the grid to cool the air, and a fan circulating the cooled air through the storage system by drawing air through the system and into a vacant space under the stacks of storage containers such that the air is circulated through the stacks to regulate their temperature. The fans are positioned outside, on the side of the grid, above a bounded volume that draws air from a large number of stacks. As the air is drawn from the outside the grid, the airflow will be highest near the fan, i.e. near the edge of the grid, and decrease towards the middle of the grid.

A problem with the prior art solutions is that it is difficult to provide the storage containers in the middle of the storage system with same environment as the storage containers in the periphery of the storage system.

In view of the above it is desirable to provide an automated storage and retrieval system, and a method of operating such as system, that solves or at least mitigates one or more of the aforementioned problems related to use of prior art storage and retrieval systems.

SUMMARY OF THE INVENTION

The present invention is set forth and characterized in the independent claims, while the dependent claims describe other characteristics of the invention.

In a first aspect, the present invention relates to an automated grid based storage and retrieval system, comprising:
- a framework structure comprising upright members and a grid of horizontal rails provided at upper ends of the upright members, the framework structure defining a storage volume comprising a plurality of columns arranged in a grid pattern below the horizontal rails between the upright members,
- a plurality of storage containers stacked vertically in stacks in the columns to provide a plurality of storage columns,
- an under-stack void extending beneath the stacks of storage containers,
- a plurality of inlets to the under-stack void between the stacks of storage containers,
- at least one column, which is empty of storage containers and arranged amongst the storage columns, to provide a ventilation column, the ventilation column comprising a fan, wherein a plurality of duct walls surrounding the ventilation column define a duct having a first end adjacent the horizontal rails and a second end adjacent the under-stack void, wherein the fan is arranged to circulate gas along sides of the stacks via the plurality of inlets, the under-stack void and through the duct.

An advantage of providing ventilation column(s) amongst the storage column is a uniform gas flow, e.g. for providing the storage containers in the middle of the grid with the same environment as the storage containers in the periphery of the storage system.

In one embodiment, the total area of each of the plurality of inlets may increase with the horizontal distance of the inlet from the ventilation column. E.g. small apertures close to the duct where the air flow is stronger in the under-stack void, and larger apertures further away from the duct where the air flow is weaker, will create a more uniform gas flow between the storage columns.

In one embodiment, the system may further comprise nozzle plates arranged at each of the plurality of inlets, wherein the nozzle plates comprising a plurality of holes, and the total the area of the plurality of holes increases with the distance of the nozzle plate from the ventilation column. Nozzle plates are easier to fit than adjusting the sizes of the inlets and allows for easier reconfiguration of the ventilations system.

In one embodiment, the system may further comprise a plurality of raised floor panels arranged at the bottom of each storage column, the raised floor panels providing the under-stack void. The raised floor panels are easy to install. In one embodiment the plurality of inlets to the under-stack void are defined by a gap between neighboring raised floor panels. Varying the gap between neighboring plates varies the total area of each inlet.

In one embodiment, each of the raised floor panels may comprise a support plate to support the stack of storage containers and a plurality of feet adapted to raise the support plate. The support plate and the feet may be integral or made of separate parts that are connected by fasteners. In one embodiment the support plate may be made of a metal, and the plurality of feet may be made of a plastic.

In one embodiment, the raised floor panel may be made of a sheet metal plate, where a center part of the sheet metal plate constitutes the support plate, and a plurality of outer parts of the sheet metal plate arranged at a perpendicular angle to the center part constitutes the plurality of feet. The outer parts of the sheet metal may be provided with openings. The openings allow for gas flow below the floor panels and/or tubes to pass through.

In one embodiment, the duct may be provided with at least one at least one sensor arranged to measure at least one quality of the gas flowing through the duct. Exemplary qualities of the gas may include at least one of temperature, humidity, particles, smoke, pollution, fungi and bacteria. A sensor in the duct may provide early warning compared to sensors arranged above the grid. The gas in the duct may also be more concentrated than above the grid and better measurements of the quality of the gas may be achieved.

The present invention also relates to a system as above, further comprising at least one cooling device arranged above the framework structure adapted to cool a gas to be circulated from above the storage columns, along the sides of the stacks, via the plurality of inlets, the under-stack void and up through the duct. This system be may used to cool products within the grid, e.g. groceries.

The present invention also relates to a system as above, further comprising at least one gaseous fire suppression device arranged above the framework structure adapted to release a fire suppression gas to be circulated from above the storage columns, along the sides of the stacks, via the plurality of inlets, the under-stack void and up through the duct to suppress a fire in the storage columns. The gaseous fire suppression device may be combined with a system comprising a cooling device. Exemplary fire suppression gases include, but are not limited to, $CO_2$ and Inergen®.

In one embodiment, the system may be adapted to increase the speed of the fan when releasing the fire suppression gas. Increasing the speed of the fan increases circulation of the fire suppression gas and improves fire suppression.

In one embodiment, the fan may be positioned at the first end of the duct adjacent the upper end of the upright members.

In a second aspect, the present invention also relates to a method of circulating a gas in an automated grid based storage and retrieval system, comprising:

a framework structure comprising upright members and a grid of horizontal rails provided at upper ends of the upright members, the framework structure defining a storage volume comprising a plurality of columns arranged in a grid pattern below the horizontal rails between the upright members, a plurality of storage containers stacked vertically in stacks in the columns to provide a plurality of storage columns, an under-stack void extending beneath the stacks of storage containers, a plurality of inlets to the under-stack void between the stacks of storage containers, at least one column, which is empty of storage containers and arranged amongst the storage columns, to provide a ventilation column, the ventilation column comprising a fan, wherein a plurality of duct walls surrounding the ventilation column define a duct having a first end adjacent the horizontal rails and a second end adjacent the under-stack void, wherein the method comprises circulating the gas along the sides of the stacks via the plurality of inlets, the under-stack void and through the duct using the fan.

In one embodiment, the step for circulating gas may comprise sucking gas from the under-stack void using the fan.

In one embodiment, the method may further comprise providing at least one cooling device above the framework structure and cooling the gas to be circulated above the storage columns to cool the storage containers.

In one embodiment, the method may further comprise providing at least one gaseous fire suppression device above the framework structure and releasing a fire suppression gas to be circulated from above the storage columns to suppress a fire in the storage columns.

In one embodiment, the method may further comprise increasing the speed of the fan when releasing the fire suppression gas.

In one embodiment, the method may further comprise releasing the fire suppression gas upon detecting a fire in the storage columns using at least one sensor provided in the duct, the at least one sensor being arranged to measure at least one quality of the gas flowing through the duct.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
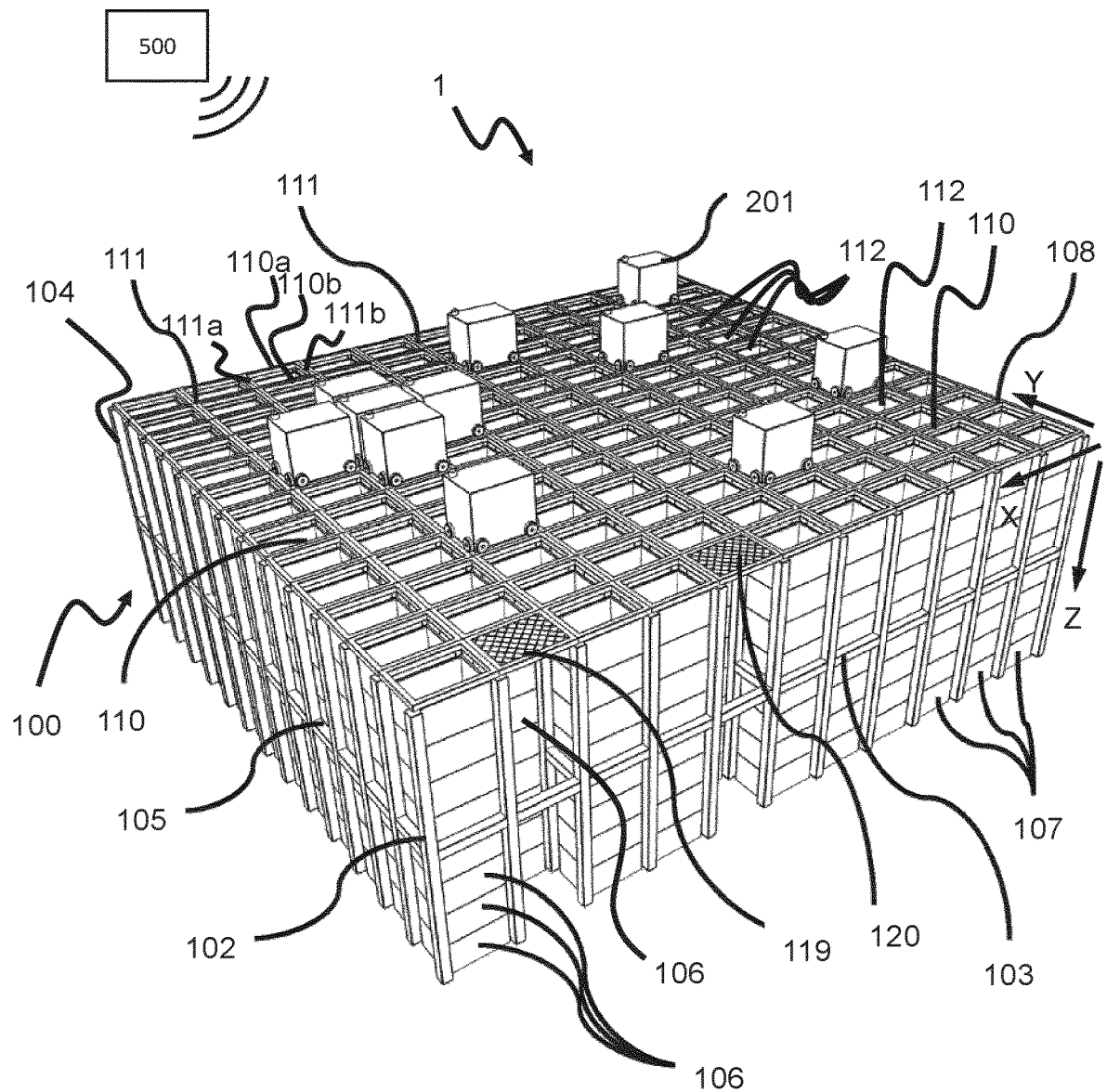
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
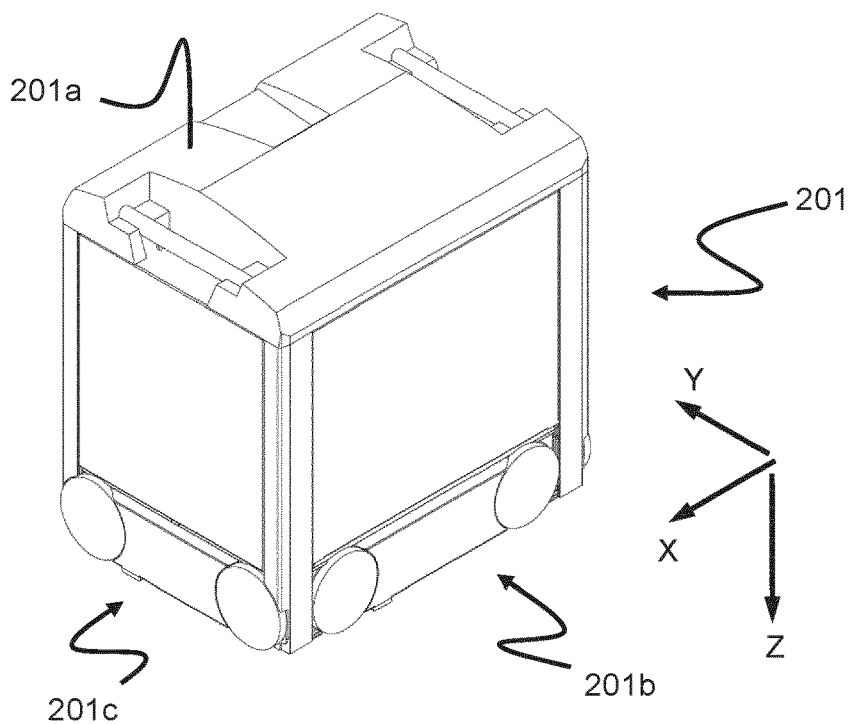
FIG. 2 is a perspective view of a prior art container handling vehicle having a centrally arranged cavity for carrying storage containers therein.
Figure 3:
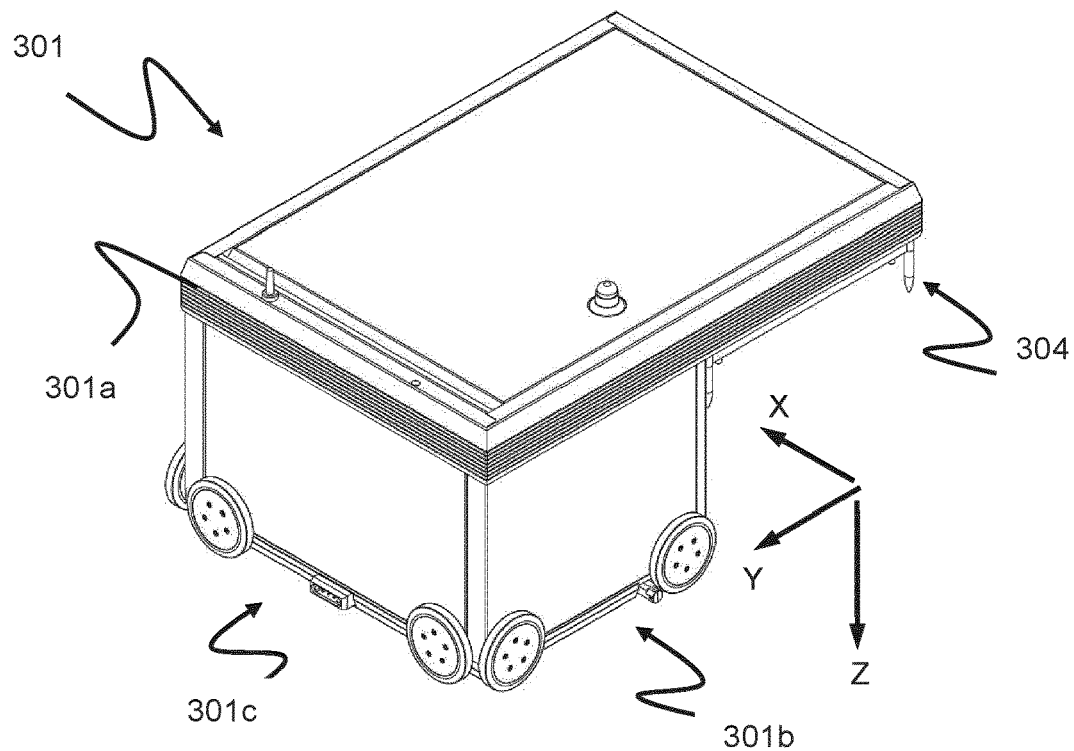
FIG. 3 is a perspective view of a prior art container handling vehicle having a cantilever for carrying storage containers underneath.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Embodiments of the automated storage and retrieval system according to the invention will now be discussed in more detail with reference to FIGS. 4-12.

Figure 4:
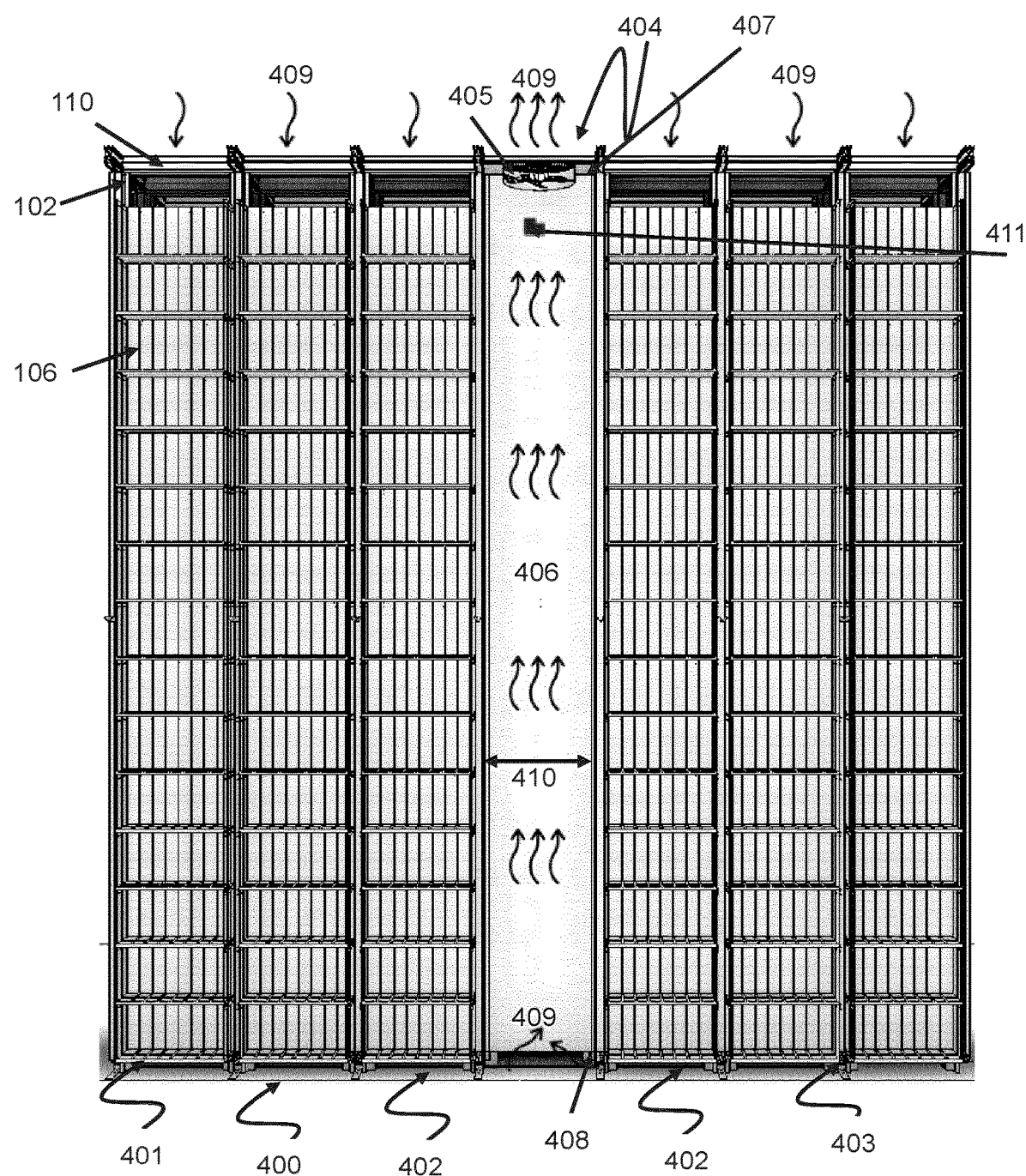
FIG. 4 is a side view of an exemplary automated storage and retrieval system according to the present invention.

FIG. 4 is a side view of an exemplary automated storage and retrieval system 1, the system comprises a frameworks structure 100 as described in detail above, the framework structure comprising upright members 102 and a grid of horizontal rails 110 provided at upper ends of the upright members 102. The framework structure 100 is defining a storage volume comprising a plurality of columns 105 arranged in a grid pattern below the horizontal rails 110 between the upright members 102. A plurality of storage containers 106 are stacked vertically in stacks 107 in the columns to provide a plurality of storage columns 105. The system further comprises an under-stack void 402 extending beneath the stacks of storage containers. The under-stack void 402 allows gas, such as air, to flow below the stacks of containers and between neighboring stacks of storage containers. The under-stack void may be provided using varies types of spacers, such as special ventilated storage containers, or raised floor panels 401 as will be discussed in further detail below. There is a plurality of inlets 403 to the under-stack void 402 between the stacks of storage containers. The distance between neighboring stacks are usually short, typically in the cm range, to achieve a compact storage and retrieval system. Airflow through the storage and retrieval system when filled up with storage containers 106 is therefore a challenge. Airflow may for example be needed for cooling process or fire suppression. In the example of a chilled environment it would help the cooling process to move air along the sides of the bin. If there is no movement in the air around the bin it will be isolated, and lead to a slow cooling process. Prior art solutions have solved this by forced air circulation passing through storage containers, where the air is drawn from an area outside the storage volume using a fan, such that there is a high airflow near the fan, i.e. near the edge of the storage volume, and decrease towards the middle of the storage volume. This leads to a non-uniform cooling of products within the storage volume.

In the automated storage and retrieval system 1 illustrated in FIG. 4, there is at least one column, which is empty of storage containers and arranged amongst the storage columns, to provide a ventilation column 404. The ventilation column 404 comprising a fan 405, and a plurality of duct walls 410 surrounding the ventilation column to define a duct 406 having a first end 407 adjacent the horizontal rails 110 and a second end 408 adjacent the under-stack void 402, wherein the fan 405 is arranged to circulate gas along sides of the stacks 107 via the plurality of inlets 403, the under-stack void 402 and through the duct 406. A ventilation column 404 amongst the storage columns creates a more uniform air flow 409 than withdrawing air on the edges of the storage volume only.

In FIG. 4, the fan 405 is positioned at the first end 407 of the duct 406 adjacent the upper end of the upright members 102. The gas in the example configuration of FIG. 4 is circulated as illustrated by airflow 409, where gas is sucked from the under-stack void 402 using the fan 405 that draws the gas up the duct 404 to an area above the storage volume. The under pressure created by sucking the gas from the under-stack void 402 draws gas from above the storage volume, down along the sides of the stacks 107 via the plurality of inlets 403 to the under-stack void 402.

Depending on the number of ventilation columns 404 and the distances between them, a similar, but limited, non-uniformity may occur. In order to reduce this non-uniformity, the system may be arranged such that the total area of each of the plurality of inlets 403 increases with the horizontal distance of the inlet 403 from the ventilation column 404. A larger total area of an inlet compared to a smaller area inlet allows more gas to flow through thus compensating for the reduced gas flow due to the distance from the ventilation column. A smaller area inlet allows less gas to flow through and thus compensating for the higher gas flow near the ventilation column. Hence an even more uniform and balanced gas flow can be achieved.

In one embodiment, the duct 406 may be provided with at least one at least one sensor 411 arranged to measure at least one quality of the gas flowing through the duct. Exemplary qualities of the gas may include at least one of temperature, humidity, particles, smoke, pollution, oxygen saturation, fungi and bacteria. A sensor in the duct may provide early warning compared to sensors arranged above the grid. The gas in the duct may also be more concentrated than above the grid and better measurements of the quality of the gas may be achieved.

Figure 5:
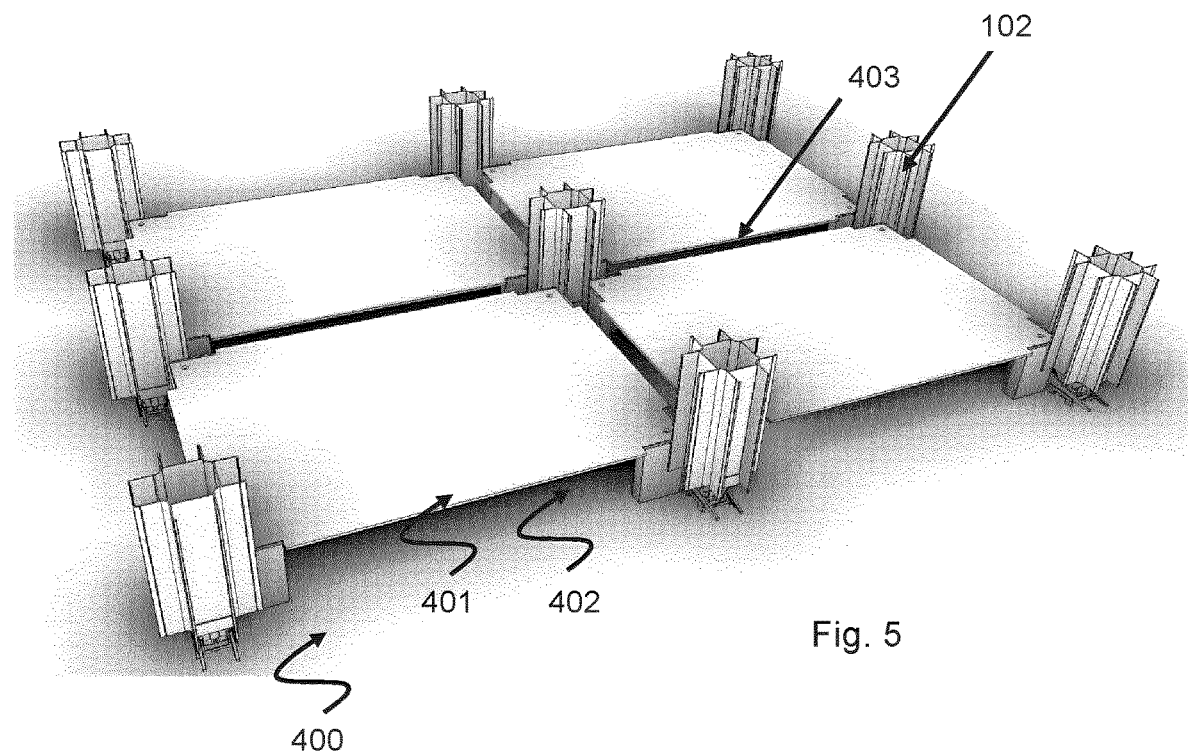
FIG. 5 is a perspective view of an exemplary raised floor according to the present invention.

FIG. 5 is a perspective view of a plurality of raised floor panels 401 arranged at the bottom of each storage column 105, where the raised floor panels 401 is providing the under-stack void 402. The raised floor panels 401 are placed at the bottom of the framework structure 100, e.g. on a floor 400 The position of the raised floor panels 401 is fixed within the framework structure 100 by the upright members 102. The raised floor panels 401 will typically be installed in the bottom of the framework structure 100 after it has been assembled.

In the embodiment illustrated in FIG. 5, the plurality of inlets 403 to the under-stack void 402 are defined by a gap between neighboring raised floor panels 401. The gap between the neighboring plates may be varied by varying the sizes of the panel or having cutouts of varying sizes over the inlet area between the stacks 107. The cutouts may be circular, square, or having any other suitable shape. The total area of each of the plurality of inlets 403 may as discussed above be varied such that the total area of each of the plurality of inlets 403 increases with the horizontal distance of the inlet 403 from the ventilation column 404.

Figure 6:
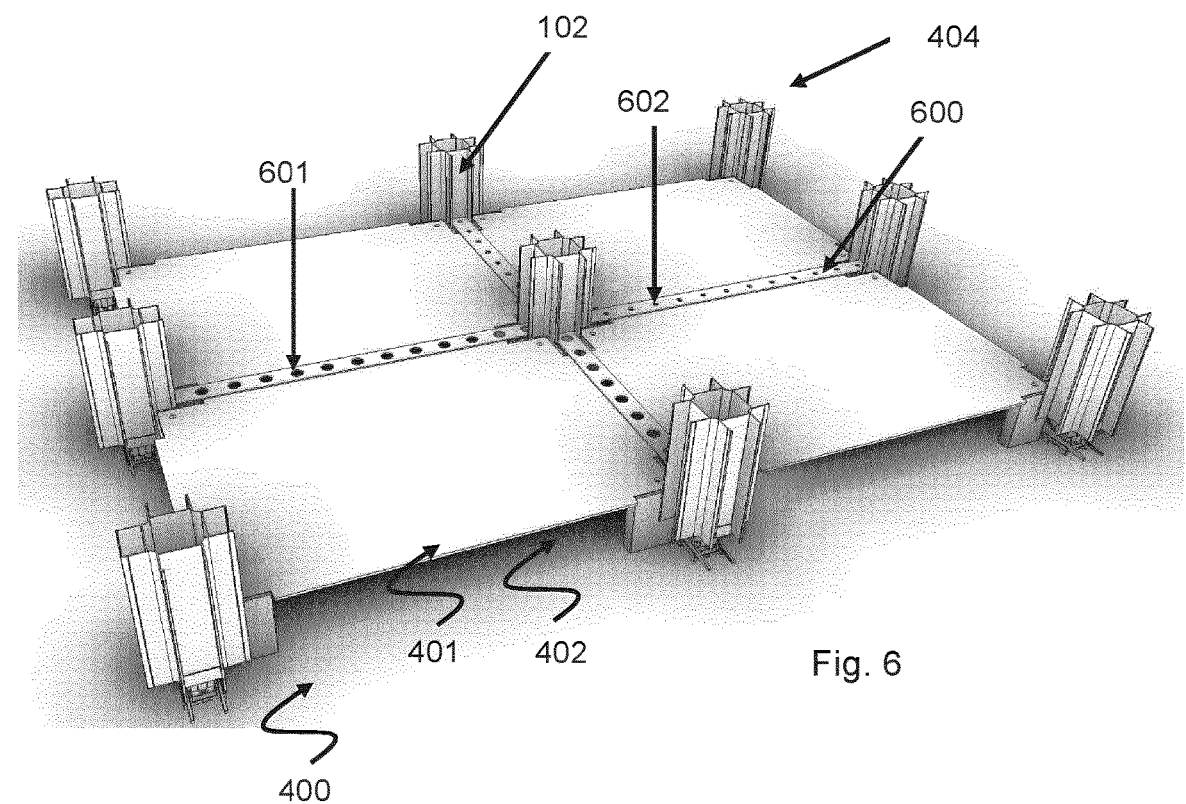
FIG. 6 is a perspective view of another exemplary raised floor according to the present invention.

FIG. 6 illustrates an embodiment where nozzle plates 600 are arranged at each of the plurality of inlets 403. The nozzle plates 600 comprising a plurality of holes 601, 602, and the total the area of the plurality of holes 601, 602 increases with the distance of the nozzle plate 600 from the ventilation column 404. The holes 601 are larger than the holes 602 closer to the ventilation column. In an alternative solution, the total area of the plurality of holes 601, 602 may alternatively or in addition be increased by increasing the number of holes 601, 602 in the nozzle plates 600. The nozzle plate 600 may have holes of the same size over the length of the nozzle plate or may have smaller holes at one end and larger holes at the other end. The nozzle plates 600 are easier to fit than adjusting the sizes of the inlets 403 and allows for easier reconfiguration of the gas flow. In an alternative embodiment valve plates are arranged at each of the plurality of inlets 403. The valve plates comprise adjustable valves to control airflow. In one embodiment the adjustable valve is a sliding gate.

Figure 7A:
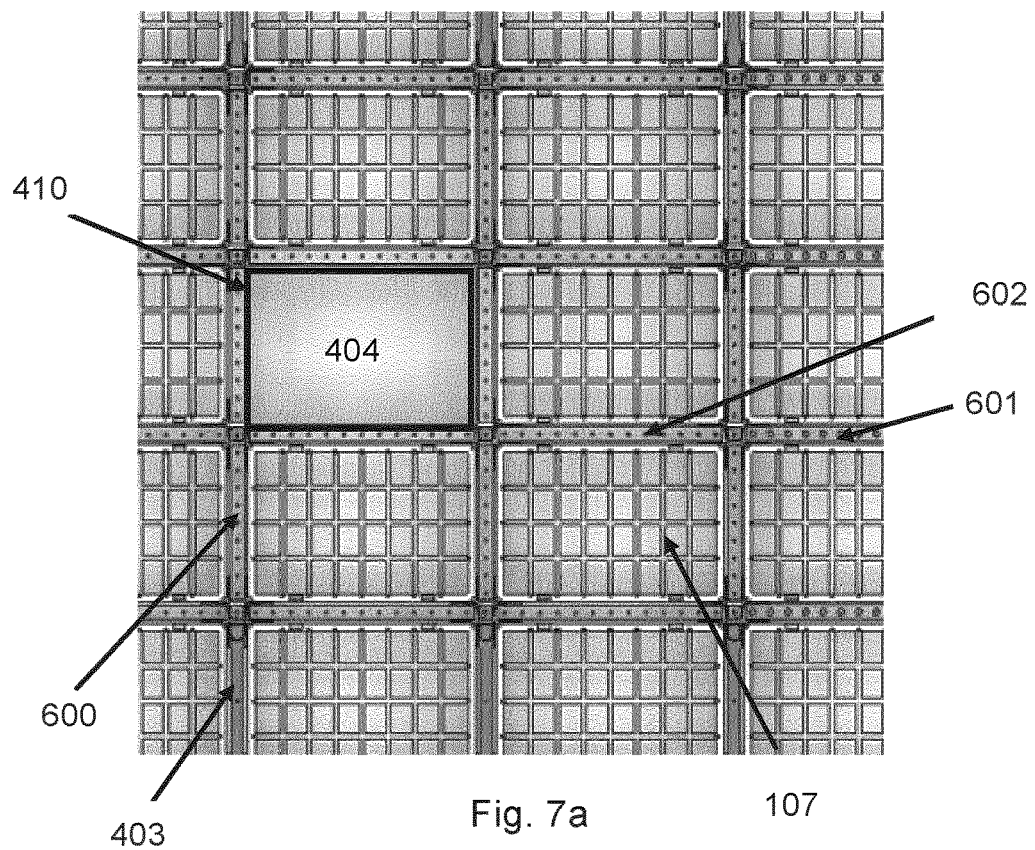
FIG. 7a is a top view of an exemplary automated storage and retrieval system according to the present invention.
Figure 7B:
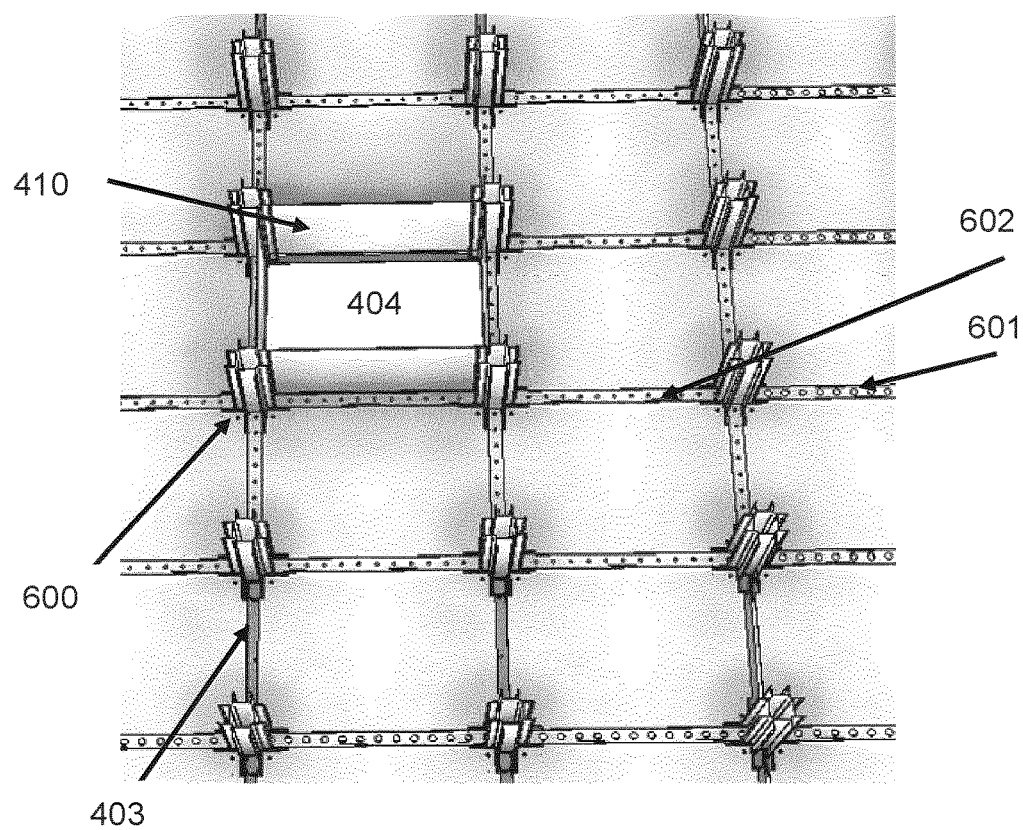
FIG. 7b is a perspective cutaway view an exemplary automated storage and retrieval system according to the present invention.

FIG. 7a is a top view of an embodiment of the invention. FIG. 7a shows a plurality of stacks 107 of storage containers surrounding the ventilation column 404. FIG. 7b is a perspective view of FIG. 7a with the storage containers removed. FIGS. 7a and 7b show the plurality of duct walls 410 surrounding the ventilation column to define the duct. The plurality of duct walls 410 may be wall panels of suitable rigid and thin material, such as aluminum, and mounted to the upright members 102. FIGS. 7a and 7b show uncovered inlets 403 to the under-stack void 402, and nozzle plates 600 are arranged over the inlets 403. The nozzle plates closest to the ventilation column 404 have holes 602 that are smaller in diameter than the holes 601 in the nozzle plate one floor panel further from the ventilation column.

Figure 8:
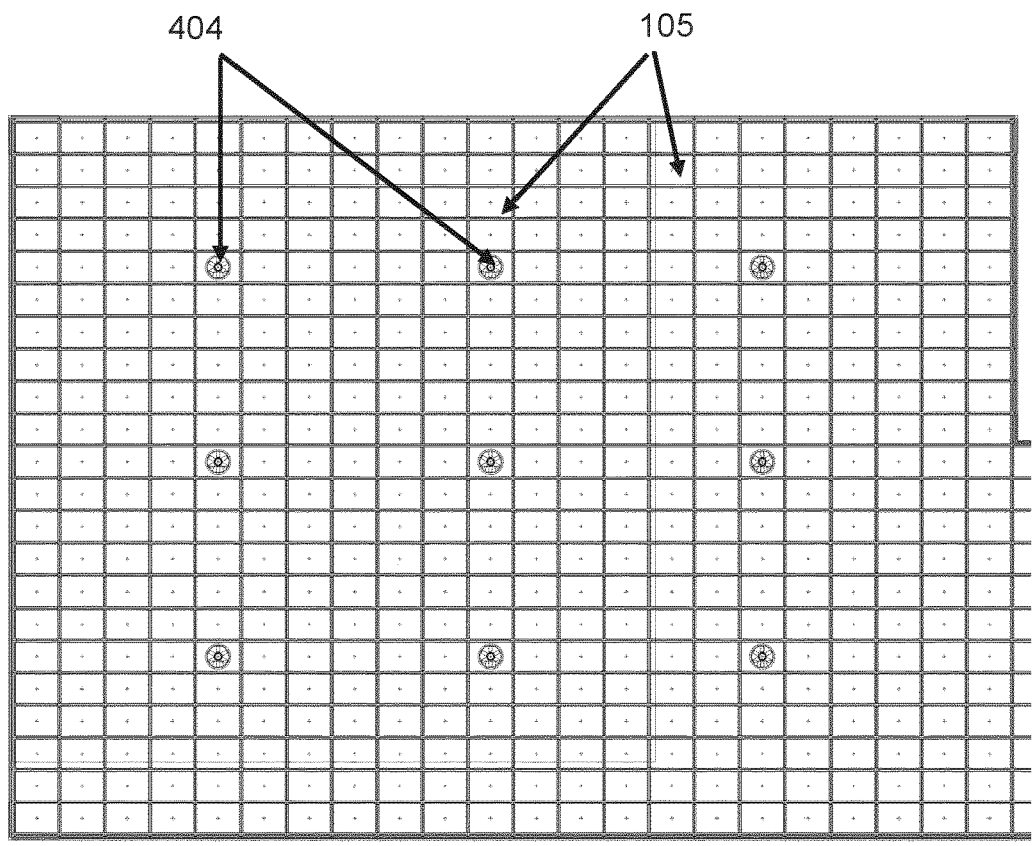
FIG. 8 is schematic top view of an exemplary automated storage and retrieval system according to the present invention.

FIG. 8 is schematic top view of an exemplary automated storage and retrieval system illustrating nine ventilation columns 404 positioned amongst the storage columns 105.

Figure 12:
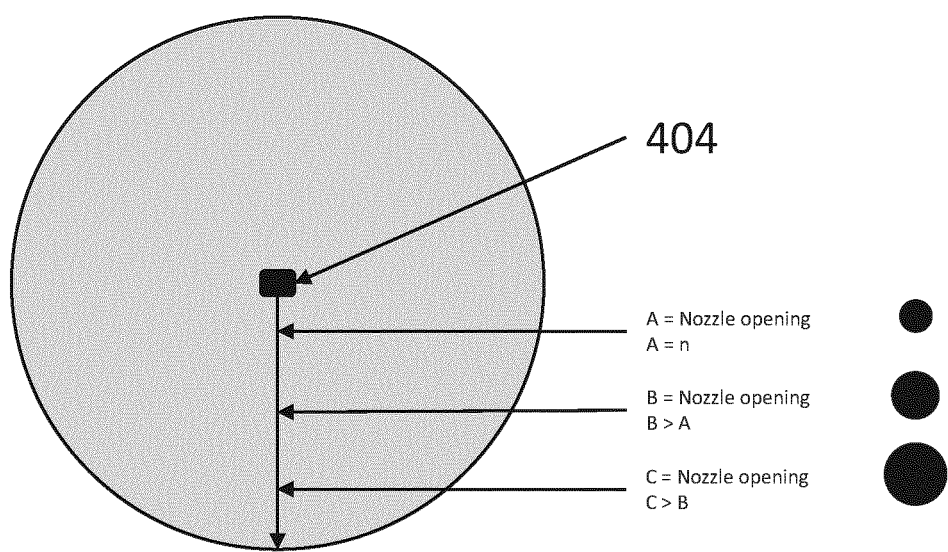
FIG. 12 is a schematic illustration of exemplary nozzle sizes according to the present invention.

FIG. 12 is a schematic illustration of nozzle sizes according to the present invention. The ventilation column 404 is in the center of a circle illustrating the distance from the ventilation column. In this example, nozzle A has a nozzle opening n. n defines the area of the nozzle opening and may e.g. be described by the diameter of the opening. Nozzle A is close to the ventilation column 404. Nozzle B positioned further away from the ventilation column 404 than nozzle A, has a nozzle opening that is larger than n, i.e. larger than nozzle A. Nozzle C positioned further away from the ventilation column 404 than nozzle B, has a nozzle opening larger than the nozzle opening of nozzle B.

Figure 9A:
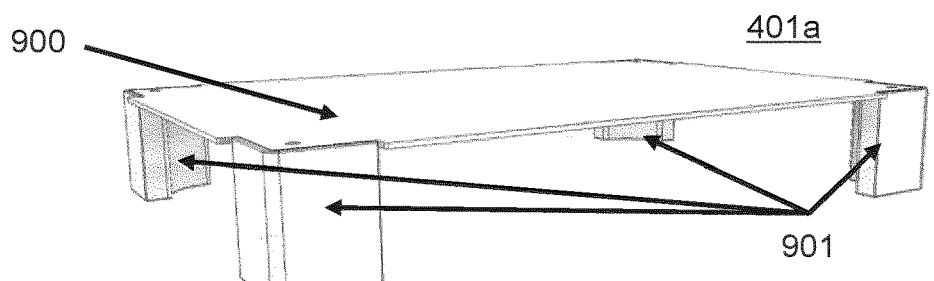
FIGS. 9a and 9b are perspective views of exemplary raised floor panels according to the invention.
Figure 9B:
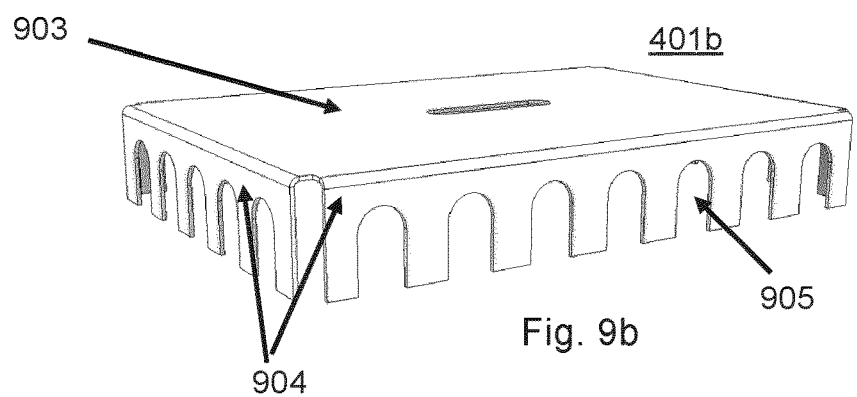

FIGS. 9a and 9b illustrate perspective views of exemplary raised floor panels 401, 401a, 401b according to the invention. Each of the raised floor panels 401, 401a, 401b may comprise a support plate 900 to support the stack 107 of storage containers and a plurality of feet 901 adapted to raise the support plate 900. The plurality of feet 901 may for example be positioned on the floor 400. The support plate 900 and the feet 901 may be integral or made of separate parts that are connected by fasteners. FIG. 9a illustrate one embodiment where the plurality of feet 901 are made of a plastic and the support plate 900 is made of a metal.

FIG. 9b illustrate one embodiment where the raised floor panel 401b is made of a sheet metal plate. A center part 903 of the sheet metal plate constitutes the support plate 900, and a plurality of outer parts 904 of the sheet metal plate arranged at a perpendicular angle to the center part 903 constitutes the plurality of feet 901. The plurality of outer parts 903 of the sheet metal may further be provided with openings 905. The openings allow for gas flow below the floor panels and/or tubes to pass through. The openings 905 may be closed by closing means, such as a plug, to adjust the airflow in the under-stack void 402. Closing an decreasing number of openings 905 with the horizontal distance of the raised floor panel 401b from the ventilation column 404 effectively increases the total area of each of the plurality of inlets 403 with the horizontal distance of the inlet 403 from the ventilation column 404. A larger total area of openings 905 compared to a smaller area of openings 905 allows more gas to flow through thus compensating for the reduced gas flow due to the distance from the ventilation column. A smaller total area of openings 905 allows less gas to flow through and thus compensating for the higher gas flow near the ventilation column. Hence an even more uniform and balanced gas flow can be achieved.

The under-stack void 402 may be provided special ventilated storage containers. Preferably low-profile storage containers. The special ventilated storage containers may be provided with adjustable openings in the sides of the storage containers to adjust the airflow through them as discussed above with reference to the raised floor panels 401b. The openings may be adjusted by sliding gates, a plurality of flaps or plugs.

Figure 10:
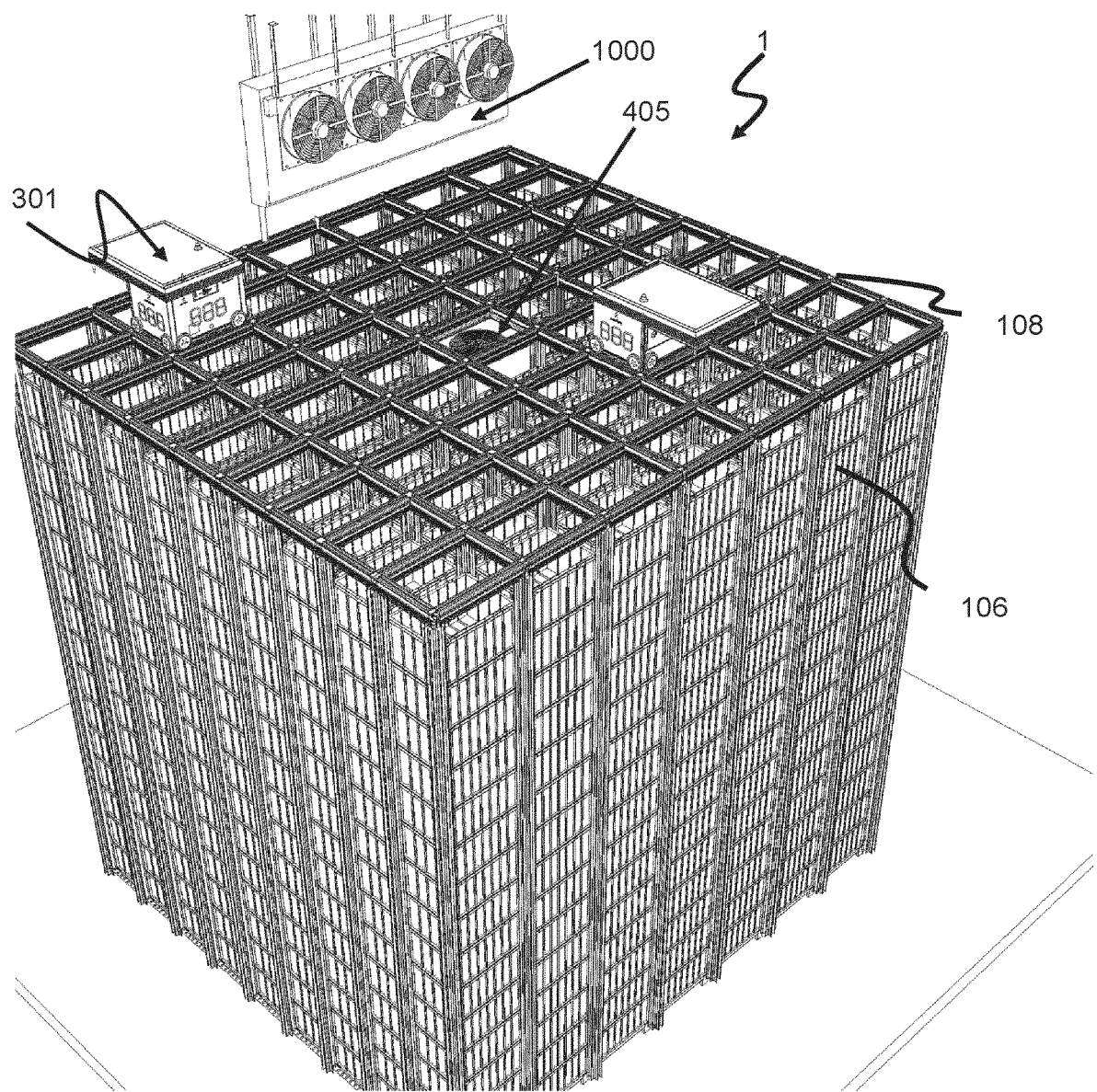
FIG. 10 is a perspective view of an exemplary automated storage and retrieval system for cooling according to the present invention.

FIG. 10 is a perspective view of a system as described above, the system further comprising at least one cooling device 1000 arranged above the framework structure 100. The at least one cooling device 1000 is adapted to cool a gas to be circulated from above the storage columns 105, along the sides of the stacks 107, via the plurality of inlets 403, the under-stack void 402 and up through the duct 406. This system be may be used to cool products, such as groceries, within the storage volume of the stacks 107. The temperature within the storage volume of the stacks 107 may be controlled by adjusting the temperature of the gas from the cooling device and/or the speed of the gas flowing through the storage volume.

Figure 11:
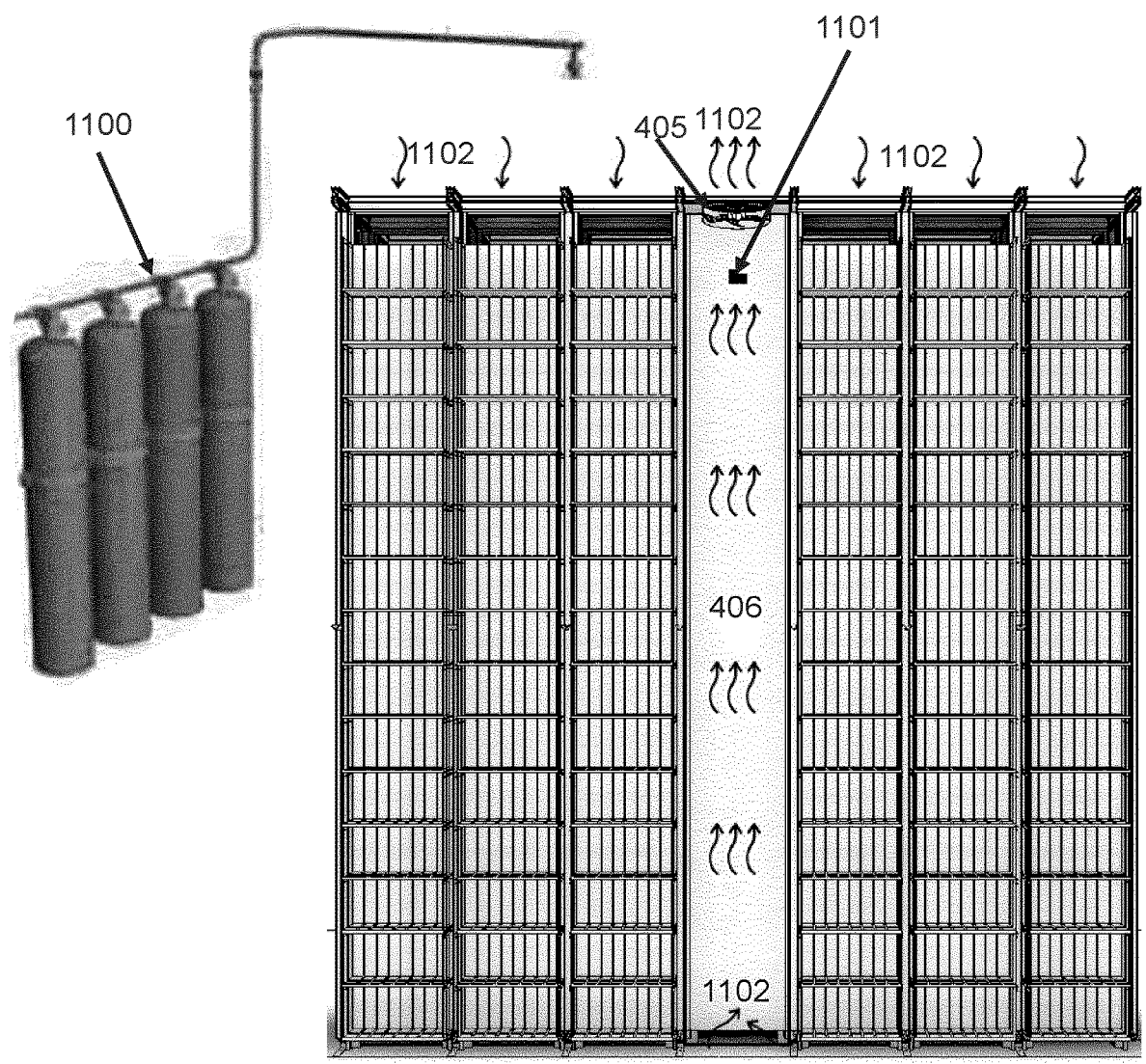
FIG. 11 is a side view of an exemplary automated storage and retrieval system with a fire suppression system according to the present invention.

FIG. 11 is a side view of a system as described above, the system further comprising at least one gaseous fire suppression device 1100 arranged above the framework structure 100. The fire suppression device 1100 is adapted to release a fire suppression gas 1102 to be circulated from above the storage columns 105, along the sides of the stacks 107, via the plurality of inlets 403, the under-stack void 402 and up through the duct 406 to suppress a fire in the storage columns 105. The system may also comprise at least one sensor 1101 to detect fire within the storage volume. The at least one sensor 1101 may be part of a separate fire sensor system, or part of the at least one sensor 411 arranged to measure at least one quality of the gas flowing through the duct. A sensor 411, 1104 in the duct may provide early warning compared to sensors arranged above the grid. The gas in the duct may also be more concentrated than above the grid and better measurements of the quality of the gas may be achieved. This allows earlier detection of fire in within the storage volume and earlier release of fire suppression gas 1102. Exemplary fire suppression gases include, but are not limited to, $CO_2$ and Inergen®. In one embodiment, the system may be adapted to increase the speed of the fan 405 when releasing the fire suppression gas 1102. Increasing the speed of the fan 405 increases circulation of the fire suppression gas 1102 and improves fire suppression. The gaseous fire suppression device may be combined with a system comprising a cooling device.

Now, with reference to FIGS. 4-12 is a method of circulating a gas in an automated grid based storage and retrieval system 1 described. The automated grid based storage system 1 comprises
  a framework structure 100 comprising upright members 102 and a grid of horizontal rails 110 provided at upper ends of the upright members 102, the framework structure defining a storage volume comprising a plurality of columns 105 arranged in a grid pattern below the horizontal rails 110 between the upright members 102,
  a plurality of storage containers 106 stacked vertically in stacks 107 in the columns to provide a plurality of storage columns 105,
  an under-stack void 402 extending beneath the stacks of storage containers,
  a plurality of inlets 403 to the under-stack void 402 between the stacks of storage containers,
  at least one column, which is empty of storage containers and arranged amongst the storage columns, to provide a ventilation column 404, the ventilation column 404 comprising a fan 405, wherein a plurality of duct walls 410 surrounding the ventilation column define a duct 406 having a first end 407 adjacent the horizontal rails 110 and a second end 408 adjacent the under-stack void 402.

The method comprises circulating the gas along the sides of the stacks 107 via the plurality of inlets 403, the under-stack void 402 and through the duct 406 using the fan 405. The step for circulating gas may advantageously comprises sucking gas from the under-stack void 402 using the fan 405. The gas is sucked from the under-stack void 402 using the fan 405 that draws the gas up the duct 406 to an area above the storage volume. The under pressure created by sucking the gas from the under-stack void 402 draws gas from above the storage volume, down along the sides of the stacks 107 via the plurality of inlets 403 to the under-stack void 402.

The method may further comprise a step of providing at least one cooling device 1000 above the framework structure 100 and cooling the gas to be circulated above the storage columns 105 to cool the storage containers 106.

The method may further comprise a step of providing at least one gaseous fire suppression device 1100 above the framework structure 100 and releasing a fire suppression gas 1102 to be circulated from above the storage columns 105 to suppress a fire in the storage columns 105. In one embodiment the method further comprises increasing the speed of the fan 405 when releasing the fire suppression gas 1102.

The method may further comprises a step of releasing the fire suppression 1102 gas upon detecting a fire in the storage columns 105 using at least one sensor 1101 provided in the duct 406, the at least one sensor 1101 being arranged to measure at least one quality of the gas 409 flowing through the duct 406.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Prior art automated storage and retrieval system
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
112 Access opening
119 First port column
120 Second port column
201 Prior art storage container vehicle
201a Vehicle body of the storage container vehicle 201
201b Drive means/wheel arrangement, first direction (X)
201c Drive means/wheel arrangement, second direction (Y)
301 Prior art cantilever storage container vehicle
301a Vehicle body of the storage container vehicle 301
301b Drive means in first direction (X)
301c Drive means in second direction (Y)
304 Gripping device
500 Control system
X First direction
Y Second direction
Z Third direction
400 Floor
401 Raised floor panel
401 Raised floor panel
401 Raised floor panel
402 Under-stack void
403 Gas inlet
404 Ventilation column
405 Ventilation column fan
406 Ventilation column duct
407 First end of duct 406
408 Second end of duct 406
409 Gas flow
410 Ventilation column duct walls
411 Sensor
600 Nozzle plate
601 Hole in nozzle plate 600 of first size
602 Hole in nozzle plate 600 of second size
900 Support plate of raised floor panel
901 Feet of raised floor panel
902 Feet of raised floor panel
903 Center part of sheet metal plate
904 Outer part of sheet metal plate
905 Opening in outer part of sheet metal plate 904
1000 Cooling device
1100 Fire suppression device
1101 Sensor
1102 Fire suppression gas
A Nozzle opening
B Nozzle opening
C Nozzle opening

The invention claimed is:

1. An automated grid based storage and retrieval system, comprising:
a framework structure comprising upright members and a grid of horizontal rails provided at upper ends of the upright members, the framework structure defining a storage volume comprising a plurality of columns arranged in a grid pattern below the horizontal rails between the upright members,
a plurality of storage containers stacked vertically in stacks in the columns to provide a plurality of storage columns,
an under-stack void extending beneath the stacks of storage containers,
a plurality of inlets to the under-stack void between the stacks of storage containers,
at least one column, which is empty of storage containers and arranged amongst the storage columns, to provide a ventilation column, the ventilation column comprising a fan, wherein a plurality of duct walls surrounding the ventilation column define a duct having a first end adjacent the horizontal rails and a second end adjacent the under-stack void, wherein the fan is arranged to circulate gas along sides of the stacks, via the plurality of inlets, and the under-stack void, and through the duct.

2. The system according to claim 1, wherein the total area of each of the plurality of inlets increases with the horizontal distance of the inlet from the ventilation column.

3. The system according to claim 1, further comprising nozzle plates arranged at each of the plurality of inlets, wherein the nozzle plates comprising a plurality of holes, and the total area of the plurality of holes increases with the distance of the nozzle plate from the ventilation column.

4. The system according to claim 1, further comprising a plurality of raised floor panels arranged at the bottom of each storage column, the raised floor panels providing the under-stack void.

5. The system according to claim 4, wherein the plurality of inlets to the under-stack void are defined by a gap between neighboring raised floor panels.

6. The system of claim 4, wherein each of the raised floor panels comprises a support plate to support the stack of storage containers and a plurality of feet adapted to raise the support plate.

7. The system according to claim 6, wherein the support plate is made of a metal, and the plurality of feet are made of a plastic.

8. The system according to claim 6, wherein the raised floor panel is made of a sheet metal plate, where a center part of the sheet metal plate constitutes the support plate, and a plurality of outer parts of the sheet metal plate arranged at a perpendicular angle to the center part constitutes the plurality of feet.

9. The system of claim 8, wherein the plurality of outer parts of the sheet metal is provided with openings.

10. The system of claim 1, wherein the duct is provided with at least one sensor arranged to measure at least one quality of the gas flowing through the duct.

11. The system of claim 1, further comprising at least one cooling device arranged above the framework structure adapted to cool the gas to be circulated from above the storage columns, along the sides of the stacks, via the plurality of inlets, and the under-stack void, and up through the duct.

12. The system of claim 1, further comprising at least one gaseous fire suppression device arranged above the framework structure adapted to release a fire suppression gas to be circulated from above the storage columns, along the sides of the stacks, via the plurality of inlets and the under-stack void, and up through the duct to suppress a fire in the storage columns.

13. The system of claim 12, further adapted to increase the speed of the fan when releasing the fire suppression gas.

14. The system according to claim 1, wherein the fan is positioned at the first end of the duct adjacent the upper end of the upright members.

15. A method of circulating a gas in an automated grid based storage and retrieval system, comprising:
a framework structure comprising upright members and a grid of horizontal rails provided at upper ends of the upright members, the framework structure defining a storage volume comprising a plurality of columns arranged in a grid pattern below the horizontal rails between the upright members,
a plurality of storage containers stacked vertically in stacks in the columns to provide a plurality of storage columns,
an under-stack void extending beneath the stacks of storage containers,
a plurality of inlets to the under-stack void between the stacks of storage containers,
at least one column, which is empty of storage containers and arranged amongst the storage columns, to provide a ventilation column, the ventilation column comprising a fan, wherein a plurality of duct walls surrounding the ventilation column define a duct having a first end adjacent the horizontal rails and a second end adjacent the under-stack void,
wherein the method comprises circulating gas along the sides of the stacks, via the plurality of inlets, and the under-stack void, and through the duct using the fan.

16. The method according to claim 15, wherein the step for circulating gas comprises sucking gas from the under-stack void using the fan.

17. The method according to claim 15, wherein the method further comprises providing at least one cooling device above the framework structure and cooling the gas to be circulated above the storage columns to cool the storage containers.

18. The method according to claim 15, wherein the method further comprises providing at least one gaseous fire suppression device above the framework structure and releasing a fire suppression gas to be circulated from above the storage columns to suppress a fire in the storage columns.

19. The method according to claim 18, wherein the method further comprises increasing the speed of the fan when releasing the fire suppression gas.

20. The method according to claim 19, wherein the method further comprises releasing the fire suppression gas upon detecting a fire in the storage columns using at least one sensor provided in the duct, the at least one sensor being arranged to measure at least one quality of the gas flowing through the duct.

* * * * *